Jan. 31, 1939.  C. E. JOHNSON ET AL  2,145,545
AIR COOLED VARIABLE SPEED DEVICE
Filed June 1, 1936
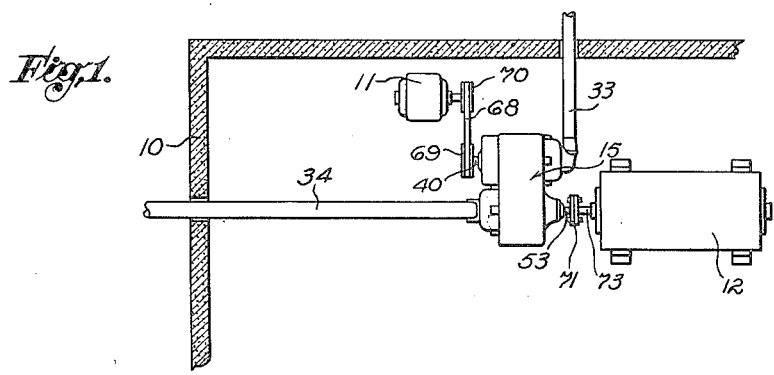
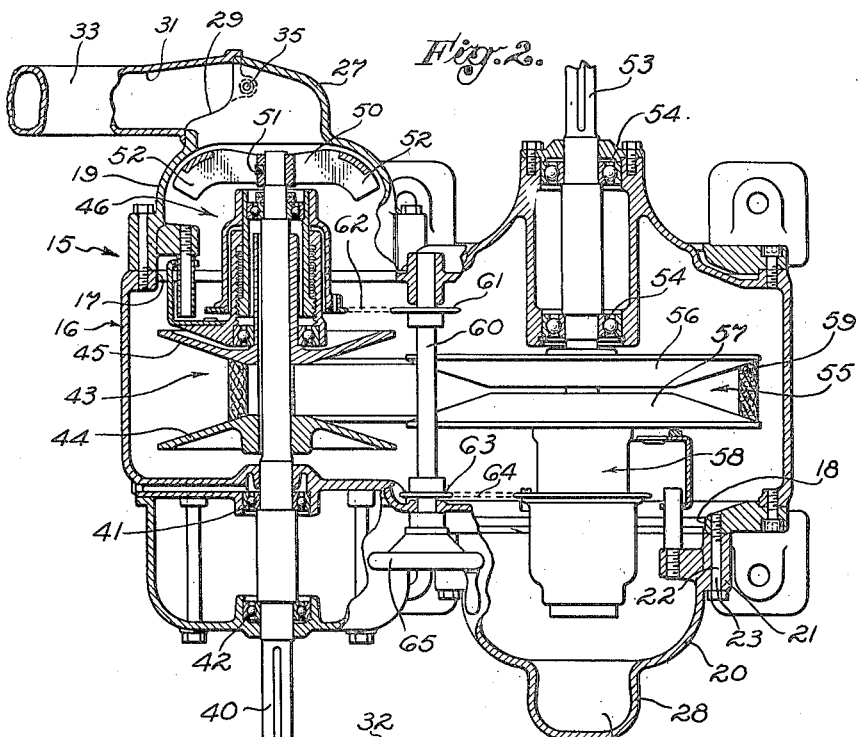
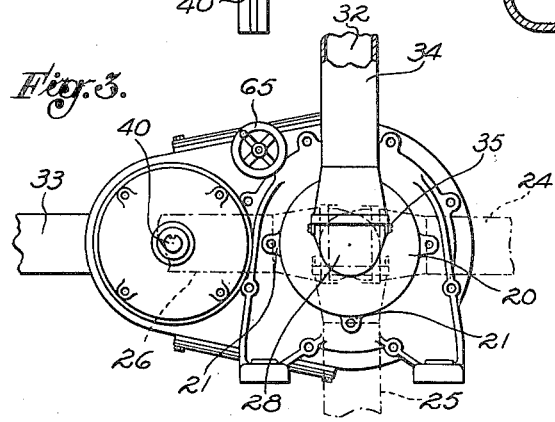
INVENTORS
CARL E. JOHNSON
EARL MENDENHALL
BY
Ford W. Harris
ATTORNEY.

Patented Jan. 31, 1939

2,145,545

UNITED STATES PATENT OFFICE 2,145,545

AIR-COOLED VARIABLE-SPEED DEVICE

Carl E. Johnson, San Marino, and Earl Mendenhall, Los Angeles, Calif., assignors to Sterling Electric Motors, Inc., Los Angeles, Calif., a corporation of California Application June 1, 1936, Serial No. 82,746

2 Claims. (Cl. 74—230.17)

Our invention relates to the transmission art, and more particularly to a variable-speed transmission system utilizing one or more variable-diameter pulleys of the V-type.

In the ordinary type of variable-speed transmission units utilizing variable-diameter pulleys, it is usual to connect the variable-diameter pulleys by means of a resilient V-belt commonly formed of rubber or other resilient material. Such a unit has a very limited range of convenient applications, due to the fact that the belt material ordinarily used is extremely susceptible to decomposition under excessive heat, and therefore the unit cannot be used satisfactorily where the working temperatures inside the unit exceed approximately 125° F. Rapid decomposition of the belting makes it impractical and uneconomical to use the ordinary unit in close proximity to a furnace, cooking oven, or other unit of machinery developing high atmospheric temperatures in the immediate neighborhood thereof. Consequently, it is the ordinary practice, where such a transmission unit is required in connection with a furnace or other high temperature machine, to position the transmission unit at a considerable distance from the machine and rely upon a long belting between the transmission unit and the machine for the driving power. This system is unsatisfactory, since one end of the belting is exposed to extreme temperatures, and furthermore the use of a high speed drive will not permit a long belt to be used satisfactorily due to stretch and loss of efficiency therein. It is a primary object of our invention to obviate these disadvantages by providing a variable-speed transmission mechanism which may be positioned in close proximity to a high temperature device to be driven thereby. We prefer to accomplish this result by providing such a transmission mechanism with means for maintaining the internal temperature thereof below 125° F.

It is a further object of our invention to provide an enclosed variable-speed unit having a housing to which are attached an inlet and an outlet flue to transport a cooling medium to and from the transmission unit, and means in connection therewith for transporting such cooling medium. In the preferred embodiment of our device, the inlet flue is extended so as to have its inlet opening in communication with a source of cooling medium, such as air. By the use of such a construction, the temperature within the variable-speed transmission unit may be maintained below the temperature of the atmosphere outside of the housing, and consequently the life of the belt connecting the variable-diameter pulleys is greatly prolonged with an attendant increase in efficiency and economy in the operation of the unit.

Another object of our invention is to provide a variable-speed transmission mechanism of the character described above in which the intake and outlet flues may be connected to the unit in any one of a plurality of positions. We prefer to accomplish this by providing the transmission housing with end bell members having openings therein adapted to receive the flues, the end bells being so constructed as to be attachable in any one of four positions.

Another object of our invention is to provide a variable-speed device with a forced feed cooling system adapted to be operated by the variable-speed unit. In its preferred embodiment, we accomplish this by providing a blower or fan element actuated by one of the rotatable shafts of the variable-speed unit.

The variable-speed transmission mechanism which we show herein is similar to that shown in our copending application Serial No. 30,112, filed July 6, 1935, entitled "Enclosed variable-speed device", to which reference is hereby made for the details of construction of the transmission mechanism.

Other objects and advantages of our invention reside in the particular structures disclosed, as well as in the general combination, which will be evident from the following description and claims.

Referring to the drawing, which is for the purpose of illustration only:

Fig. 1 is a diagrammatic view showing our invention installed with relation to a device to be driven thereby.

Fig. 2 is a sectional plan view of the variable-speed transmission of our invention.

Fig. 3 is an elevational view, slightly decreased in size, of the device shown in Fig. 2.

Referring to Fig. 1, we show in diagrammatic form our invention installed in connection with the accompanying mechanism, in which the chief structural units are generally designated for convenience as follows: a wall 10 of a building in which the device is placed; an electric motor 11 adapted to drive our variable-speed transmission; a machinery unit 12 adapted to be driven by our variable-speed transmission; and the variable-speed transmission unit 15.

As shown in Fig. 2, the variable-speed transmission unit 15 is provided with a housing 16 having openings 17 and 18 in the opposite sides thereof, which openings are adapted to be closed by bell-shaped covers 19 and 20, respectively. The bell-shaped cover 20 is provided with a plurality of bosses 21 spaced equi-distant from each other around the circumference of the cover, each of which has an opening 22 therein through which bolts 23 may be passed to secure the cover to the housing 16. As shown in Fig. 3, the bell cover 20 may be attached to the housing 16 in any one of the positions shown by the full lines therein or the dotted lines 24, 25, or 26. The bell-shaped covers 19 and 20 are provided with cup-shaped projections 27 and 28, respectively, having openings 29 and 30, respectively, therein adapted to communicate with openings 31 and 32 in flue members 33 and 34 rigidly attached to the cup-shaped members 27 and 28 by suitable transverse bolts 35. The cup-shaped member 19 is of a construction similar to that of the member 20 and is attached in the same manner to the housing 16. Accordingly, it will be noted that both of the cup-shaped members may be attached to the housing 16 in any one of a plurality of positions so as to accommodate the flue members 33 and 34 which, as shown in Fig. 1, are preferably of sufficient length to extend through the walls 10 of the building in which the device is housed so as to provide the flue members with inlet and outlet openings at points remote from the transmission device 15, and particularly so that the flue member 33 having the inlet opening therein may have its outer end accessible to a supply of cool air or other cooling medium. By providing the bell-shaped covers 19 and 20 with means for attaching them to the housing 16 in any one of a plurality of positions, the flue members 33 and 34 may be conducted from the transmission mechanism 15 in any desirable manner so as to pass over, under, or around other mechanism which may be adjacent the system shown in Fig. 1 in an actual installation.

Although any suitable variable-speed transmission mechanism having an enclosed housing may be utilized in connection with our invention, we prefer to use a mechanism as best shown in Fig. 2, which is similar to that shown in our co-pending application Serial No. 30,112, filed July 6, 1935, entitled "Enclosed variable-speed device". The transmission unit 15 is provided with a drive shaft 40 supported in suitable bearings 41 and 42 attached to the housing 16 and carries thereon a variable-diameter pulley 43 of the V-type having a fixed flange 44 and a movable flange 45. Adjustment means 46 are provided to axially move the movable flange 45 relative to the fixed flange 44 to vary the effective diameter of the pulley 43. On the inner end of the drive shaft 40 is positioned a fan or blower element 50 fixed to the drive shaft by suitable means, such as a screw 51, and having blades 52 adapted to rotate with the drive shaft in close proximity to the interior surface of the bell cover 19. When the drive shaft 40 is rotated, the fan element 50 operates to draw air or other cooling medium through the flue member 33 and into the variable-speed device 15, thereby effectively cooling the mechanism thereof and maintaining the temperature within the housing 16 below 125° F. so as to prolong the life of the belt means therein and to prevent the mechanism from overheating.

A driven shaft 53 extends into the housing 16 and is supported in suitable bearings 54. The driven shaft 53 carries thereon a variable-diameter pulley 55 of the V-type having a fixed flange 56 and a movable flange 57 with adjustment means 58 for moving the movable flange axially relative to the fixed flange to vary the effective diameter of the pulley. The pulleys 43 and 55 are connected by means of a resilient belt 59 formed of rubber or other composition material of sufficient resiliency to form a positive driving connection between the pulleys. The adjustment means 46 and 58 are simultaneously and oppositely actuated by means of a control rod 60 journaled in the housing 16 and connected by means of a sprocket 61 and chain 62 to the adjustment means 46, and connected by means of a sprocket 63 and chain 64 to the adjustment means 58. A handwheel 65 is provided on the control rod 60 on the outside of the housing 16, and may be manually rotated in either direction to vary the relative diameters of the pulleys 43 and 55.

As shown in Fig. 1, the transmission unit 15 is adapted to be connected to a source of power, such as a motor 11, through a drive belt 68 connecting a pulley 69 positioned on the drive shaft 40 of the transmission device and a pulley 70 positioned on the drive shaft of the motor 11. Likewise, the transmission unit 15 is designed to be connected directly to a device to be driven, such as the unit 12, which may be a high temperature cooking oven or other such device, by means of a rigid coupling 71 operatively connecting the driven shaft 53 and a shaft 73 associated with the device to be driven. By providing the cooling means for the transmission unit, we are able to close-couple the unit with relation to the device to be driven, thus eliminating the necessity of a long belt coupling between the devices.

When our invention is in operation in a system such as shown in Fig. 1, the motor unit 11, operating through the drive belt 68, rotates the drive shaft 40 of the transmission device 15. Rotation of the drive shaft 40 causes the fan element 50 to rotate therewith, thus creating a suction in the cup-shaped member 27 and the flue member 33 to draw air from the exterior of the walls 10 through the flue member and into the housing 16 so as to keep the unit cool. The fan element 50 also serves as a blower to force air out of the housing 16 through the flue 34, thus producing a continuous flow of cooling medium through the transmission during the operation thereof. It will be understood that although we have shown the fan element 50 mounted on the drive shaft 40 in the present embodiment shown in Fig. 2, it may be mounted on the driven shaft 53 without departing from the spirit of our invention.

Although we have illustrated the preferred embodiment of our invention, it is to be understood that we do not wish to be limited to the specific form shown because various substitutions and interchanges of parts will be readily apparent to one skilled in the art from our disclosure.

We claim as our invention:

1. In a variable speed transmission device for operation in a high temperature environment, the combination of: a housing having an opening in one side thereof; a drive shaft extending into said housing from the opposite side thereof and extending through said opening; a driven shaft extending into said housing; a pair of variable diameter pulleys of the V-type, one of said pulleys being on said drive shaft and the other of said pulleys being on said driven shaft; belt means operatively connecting said pulleys; adjustment means for varying the diameter of said pulleys;

fan means on the end of said drive shaft extending through said opening; a bell-shaped cover adapted to enclose said fan means, said cover having a flue opening in the outer portion thereof; a flue connected to said cover so as to communicate with the interior thereof through said flue opening, said flue being adapted to convey a cooling medium from a remote source thereof to said cover; means for securing said bell-shaped cover to said housing in a plurality of positions so that said flue may be positioned in any one of a plurality of positions relative to said housing; and an exhaust passage in said housing adjacent said driven shaft adapted to permit said cooling medium to be exhausted from said housing.

2. In a variable speed transmission device for operation in a high temperature environment, the combination of: a housing having an opening in one side thereof; a drive shaft extending into said housing from the opposite side thereof and extending through said opening; a driven shaft extending into said housing; a pair of variable diameter pulleys of the V-type, one of said pulleys being on said drive shaft and the other of said pulleys being on said driven shaft; belt means operatively connecting said pulleys; adjustment means for varying the diameter of said pulleys; fan means on the end of said drive shaft extending through said opening; a bell-shaped cover adapted to enclose said fan means, said cover having a flue opening in the outer portion thereof, said cover having a flange adapted to cooperate with a surface on said housing to form a joint between said cover and said housing; a flue connected to said cover so as to communicate with the interior thereof through said flue opening, said flue being adapted to convey a cooling medium from a remote source thereof to said cover; bolts for securing said bell-shaped cover to said housing in a plurality of positions so that said flue may be positioned in any one of a plurality of positions relative to said housing; and an exhaust passage in said housing adjacent said driven shaft adapted to permit said cooling medium to be exhausted from said housing.

CARL E. JOHNSON.
EARL MENDENHALL.